(12) United States Patent
Blume et al.

(10) Patent No.: US 9,311,470 B2
(45) Date of Patent: Apr. 12, 2016

(54) METHOD AND SYSTEM FOR AUTHENTICATING A USER

(75) Inventors: Marco Blume, Paderborn (DE); Michael Nolte, Brakel (DE)

(73) Assignee: Schaumburg und Partner Patentanwälte mbB (DE)

( * ) Notice: Subject to any disclaimer, the term of this patent is extended or adjusted under 35 U.S.C. 154(b) by 839 days.

(21) Appl. No.: 12/596,073

(22) PCT Filed: Apr. 24, 2008

(86) PCT No.: PCT/EP2008/054999
§ 371 (c)(1),
(2), (4) Date: Oct. 15, 2009

(87) PCT Pub. No.: WO2008/132129
PCT Pub. Date: Nov. 6, 2008

(65) Prior Publication Data
US 2010/0146264 A1 Jun. 10, 2010

(30) Foreign Application Priority Data
Apr. 25, 2007 (DE) .......................... 10 2007 019 541

(51) Int. Cl.
*H04L 29/06* (2006.01)
*G06F 21/34* (2013.01)
*G06F 21/33* (2013.01)
*G06Q 20/38* (2012.01)

(52) U.S. Cl.
CPC ................ *G06F 21/34* (2013.01); *G06F 21/33* (2013.01); *G06Q 20/3821* (2013.01)

(58) Field of Classification Search
USPC ......................................................... 713/156
See application file for complete search history.

(56) References Cited

U.S. PATENT DOCUMENTS

| 6,968,459 | B1 | 11/2005 | Morgan et al. |
|---|---|---|---|
| 8,010,785 | B2 * | 8/2011 | Kawai et al. .................. 713/156 |
| 8,052,048 | B1 * | 11/2011 | Doland et al. ................ 235/379 |
| 2002/0053022 | A1 * | 5/2002 | Groves et al. ................. 713/155 |
| 2002/0118099 | A1 * | 8/2002 | Oda et al. .................... 340/10.52 |
| 2004/0044535 | A1 * | 3/2004 | Conner et al. .................... 705/1 |
| 2004/0059916 | A1 | 3/2004 | Mizushima et al. |
| 2004/0064708 | A1 | 4/2004 | Angelo et al. |

(Continued)

OTHER PUBLICATIONS

USB Implementers Forum: "Universal Serial Bus Mass Storage Class", Sep. 30, 1999, XP002489594, p. 9-p. 10.

(Continued)

*Primary Examiner* — Esther B Henderson
(74) *Attorney, Agent, or Firm* — Harness, Dickey & Pierce, P.L.C.

(57) ABSTRACT

The invention relates to a system and a method for authenticating a user. A removable storage medium (12) has at least one storage area in which identification data for identifying the removable storage medium (12) are stored, in this storage area or in a further storage area of the removable storage medium (12) data of a digital certificate (14) being stored. Further, a data processing system (18) is provided to which the removable storage medium (12) is connected via a data transfer connection. The identification data and the data of the digital certificate (14) are transferred from the removable storage medium to the data processing system (18). The data processing system (18) processes the identification data and the data of the digital certificate (14) and authenticates the user.

20 Claims, 3 Drawing Sheets

(56) References Cited

U.S. PATENT DOCUMENTS

2006/0234797 A1    10/2006   Davis et al.
2007/0266443 A1*   11/2007   Wilson et al. .................. 726/27

OTHER PUBLICATIONS

Ball E et al: "Role-based access control with X.509 attribute certificates", IEEE Internet Computing, IEEE Service Center, New York, NY, US, vol. 7, No. 2, Mar. 1, 2003, pp. 62-69, XP011095972, ISSN: 1089-7801, p. 63-p. 66.

"Information technology—Open systems Interconnecton—The Directory: Public-key and attribute certificate frameworks; X.509 (Aug. 2005)", ITU-T Standard in Force (I), International Telecomunication Union, Geneva, CH, No. X.509 (Aug. 2005), Aug. 29, 2005, XP017405086, p. 62-p. 67.

A. Rickey et al., "Universal Serial Bus Mass Storage Class", Bulk-Only Transport, USB Device Class Definition for Mass Storage Devices, USB Implementers Forum, 1998, pp. 1-22.

D. Chadwick et al., "Role-Based Access Control With X.509 Attribute Certificates", University of Salford, IEEE Computer Society, Mar. 2003, pp. 62-69.

International Telecommunicaton Union, "Series X: Data Networks, Open System Communications and Security", Information Technology—Open Systems Interconnection—The Directory: Public-key and Attribute Certificate Frameworks, Aug. 2005, pp. 1-80.

* cited by examiner

METHOD AND SYSTEM FOR AUTHENTICATING A USER

The invention relates to a method and a system for authenticating a user in a data processing system. In particular, the invention serves to authenticate a user at a money transaction device. In data processing systems, in particular in data processing systems that are part of a money transaction device, a large number of safety aspects have to be taken into account to ensure that these data processing systems cannot be manipulated by unauthorized persons. Especially the transfer of data, in particular of program data, from a removable storage medium to the data processing system as well as of data from the data processing system to a removable storage medium connected to this data processing system should be reliably prevented in the case of unauthorized users.

In money transaction devices, such a data transfer is to be prevented for unauthorized users if only for safety reasons in order to meet data protection requirements and to prevent manipulations. Known money transaction devices can, in particular, be self-service systems that comprise a large number of electronic components. Such components are, for example, contained in a cash dispensing unit, a keyboard, a card reading and writing device as well as in further peripheral devices. These individual components are connected to the data processing system of the money transaction device via communication interfaces and data lines. Each of these components processes and generates data, in particular operating protocols, trace data and error information. Usually, these data are stored in a storage area of a non-volatile storage of the data processing system, in particular a hard disk storage unit of the data processing system. For various reasons, it is useful to process and, in doing so, to analyze these data on a further data processing system, in particular centrally at the manufacturer of the money transaction device. An analysis of these data can, for example, also be carried out with the aid of suitable software on a laptop computer of a service technician. In doing so, it can be necessary to transfer these data with the aid of a pluggable flash memory, such as a flash memory having an integrated USB interface, a so-called USB stick, from the data processing system of a money transaction device to the further data processing system, such as the laptop computer of the service technician. To this end, the relevant data are copied or moved from the data processing system of the money transaction device into a storage area of the pluggable flash memory. However, given conventional data processing systems, such a data transfer is not protected so that each operator having access to the data processing system of the money transaction device can copy these data. As a result thereof, a misuse of these data cannot be ruled out. Further, when transferring data stored in a storage area of the pluggable flash memory to the data processing system of the money transaction device it should likewise be ensured that this data transfer is only allowed for authorized users. The same problems occur when other removable storage media are used instead of the pluggable flash memory. For granting further user rights in a data processing system, too, a reliable authentication of a user is required in order to grant this user preset user rights. These user rights can in particular prevent the execution of application programs with which safety-relevant settings of the money transaction device can be changed or which cause a manipulation of the money transaction device in some other way and/or can affect the safe operation of the money transaction device.

It is the object of the invention to specify a system and a method for authenticating a user, by which a user can easily and reliably be authenticated.

By means of a system and method according to the preferred embodiment, it is easily possible to assign preset user rights to an operator, such as a service technician, in the data processing system and to reliably authenticate the operator as a user of this user group. As a result thereof, in particular safety-relevant operating functions will not be provided to unauthorized operators. By linking a certificate to the identification code for identifying the removable storage medium, the authentication of the user is bound to the presence of the removable storage medium assigned to the certificate. This offers a relatively high reliability in the authentication of the user so that accesses by unauthorized users to safety-relevant functions can effectively be prevented. As a removable storage medium, common cost-efficient removable storage media such as USB memory sticks and/or removable hard disks can be used which have the required identification information. The removable storage medium thus does not have to have a controller for execution of an administration process which administers digital certificates, generates random numbers as well as pseudo-random numbers and encrypts random numbers and data. A simple cost-efficient removable storage medium without controller, such as a simple mass storage, with stored identification data and a stored certificate is thus sufficient for the invention.

In a development of the invention, the user is identified and the identified user is authenticated, user rights being preset in the data processing system for the user and/or for a user group to which the user is assigned, which user rights are activated for this user by the authentication of the user. In doing so, the identification of the user can likewise be determined with the aid of the identification code for the identification of the removable storage medium and/or with the aid of the digital certificate that is stored in the storage area of the removable storage medium.

Preferably, the certificate is a attribute certificate, the identification code and/or a password which can be entered via a user interface of the data processing system being used as attributes which are linked to a certificate by a certificate authority. The attribute certificate preferably refers to the attribute or, respectively, the attributes and to a further certificate.

Further, it is advantageous to store a manufacturer identification code and a serial number identification code as an identification code in the storage area of the removable storage medium. The manufacturer identification code and the serial number identification code are preferably attributes of the certificate.

The certificate preferably has a predetermined validity, the certificate becoming void with expiration of this validity and being no longer accepted by the data processing system. The authenticity of the certificate as well as the validity of the certificate can be checked by the data processing system, the user being authenticated after a successful check. As a result thereof, in particular a permanent misuse of the removable storage medium for authenticating a user can be effectively prevented.

With the aid of the certificate a public key of an asymmetric key pair of the user can be certified, with the aid of which data are encrypted that can be decrypted with the private key of the key pair. Preferably, data which are transferred from the data processing system to the removable storage medium are encrypted with the aid of the certified public key before transfer.

In a preferred embodiment, the data processing system is part of a money transaction device, the money transaction device preferably being a cash deposit machine, a cash dispensing machine, a cash recycling machine, an automatic cash safe, an automatic cash system and/or a cash register system.

The removable storage medium is preferably an external hard disk and/or an external flash memory, the removable storage medium being connectable to the data processing system via a data line and preferably via a standard interface. The standard interface is preferably a USB interface, and the flash memory is preferably a memory card and/or a pluggable USB memory. As a result thereof, for authentication of the user, a removable storage medium can be used which has a sufficiently large storage area in order to also store large amounts of data from the data processing system to the removable storage medium as well as to transfer large amounts of data from the removable storage medium to the data processing system. In this way, data for a system update of the operating system and/or of application software of the data processing system can be safely transferred.

In another preferred embodiment of the invention the transfer of data from the data processing system to the removable storage medium and/or the transfer of further data from the removable storage medium to the data processing system are only possible after a successful authentication of the user. As a result thereof, the data transfer can be prevented if no authentication of the user that allows the respective data transfer has been performed. As a result thereof, it is ensured both that safety-relevant data cannot be transferred from the data processing system to the removable storage medium by unauthorized operators as well as that undesired data, in particular harmful program codes, such as viruses, are not transferred from the removable storage medium to the data processing system.

The certificate can be created in an initialization process and stored in a storage area of the removable storage medium. Preferably, the certificate is created in accordance with a standard for digital certificates, in particular according to the X.509 standard. This X.509 standard is available in the version 3 at the application date.

The identification code or, respectively, the identification codes of the removable storage medium are stored by the manufacturer preferably during the production process of the removable storage medium as read-only data in a storage area of the removable storage medium that cannot be changed later on. The certificate can likewise be stored in the form of read-only data in such a storage area that can no longer be changed or, alternatively, preferably be stored in a further rewritable storage area of the removable storage medium, which is rewritable and in which further data can be stored. In this preferred embodiment, in which the data of the certificate are stored in a further rewritable storage area of the removable storage medium, the certificate can be renewed in an easy manner in that the existing certificate is erased and replaced by a new certificate.

The attribute certificate can authorize a user to execute at least one application program by the data processing system. To this end, in particular the application program or another program module can check whether a corresponding authorization of the user by an inventive authentication of the user has been performed, and/or cause such an authentication of the user for authorization when the program is started.

By means of the invention safety-relevant functions of an application software or safety-relevant application software can be activated and/or executed only after a positive check of the authorization of the operator or the logged on user. Altogether, data protection and data safety are increased by means of the invention.

A method for authenticating a user can be developed in the same manner as specified for the system for authenticating a user, in particular by the features of the independent claims.

Further features and advantages of the invention result from the following description, which, in connection with the enclosed Figures, explains the invention in more detail with reference to an embodiment.

Figure 1:
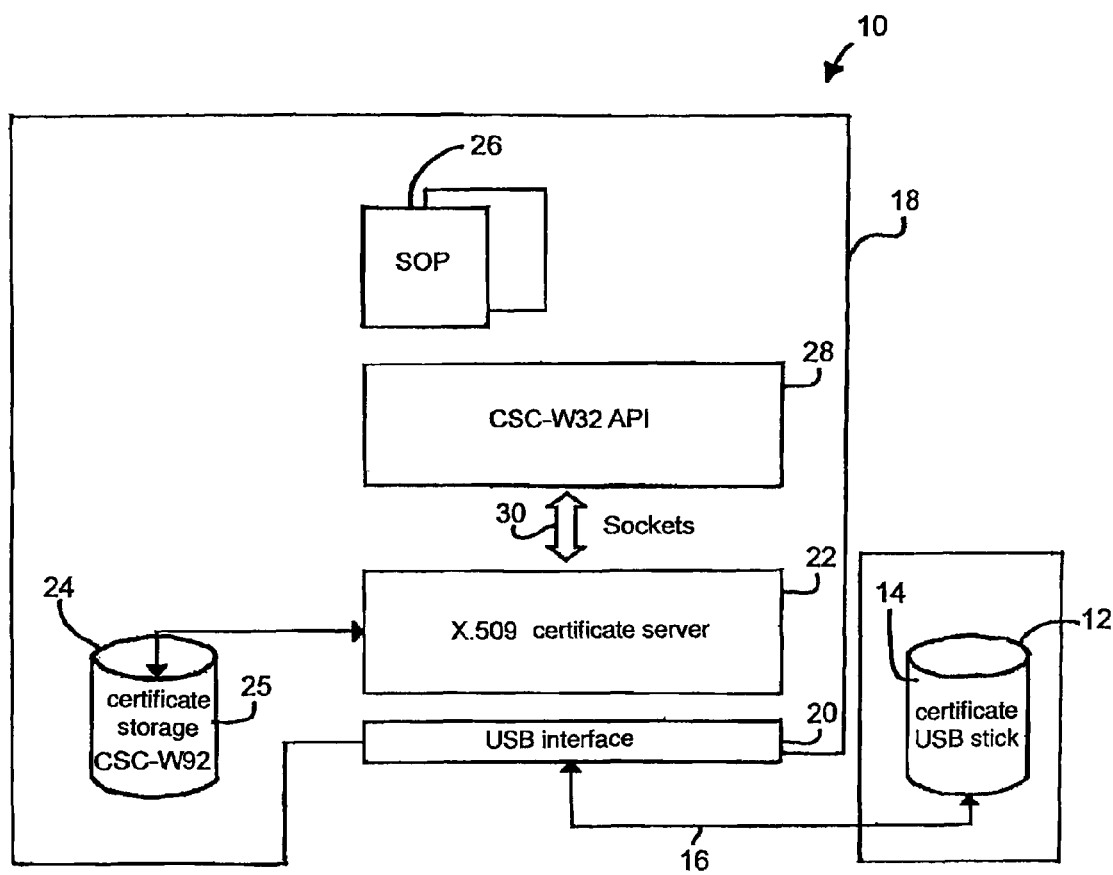
FIG. 1 shows a block diagram with components for authenticating a user.

In FIG. 1 a block diagram of a system for authenticating a user is illustrated, with the aid of which system a service technician can be authenticated by a data processing system as a user of the user group "Technicians" by means of a certificate 14 stored on a USB memory stick 12. The USB memory stick 12 is connected via a data line 16 to a USB interface 20 of the data processing system 18. The data processing system 18 provides a certificate server 22 according to the certificate standard X.509 with the aid of a program module. The certificate server 22 has access to a non-volatile memory area 24, such as a hard-disk storage area, in which certificates 25 are stored. With the aid of the certificates 25 different certificates stored on different USB memory sticks, USB hard-disks or other USB removable storage media can be checked. In particular, the non-volatile storage area 24 includes at least one certificate 25 to which the certificate 14 stored in the USB memory stick 12 refers.

The service technician starts via a graphical user interface at least one service and operating application program 26. This service and operating application program 26 passes a defined request in the form of a text field to a CSC-W32 API program module 28 which provides an application interface for the service and operating application program 26 and further programs. The CSC-W32 API program module 28 is a client which makes use of services of the X.509 certificate server 22 via at least one socket connection 30. The CSC-W32 API program module 28 forwards the request of the service and operating application program 26 to the certificate server 22 as a request.

Based on this request, the certificate server 22 checks whether the logged on current user can be authenticated as a user of the user group "Technicians" in that the certificate server 22 checks with the aid of the certificates 25 stored in the non-volatile storage area 24 whether the certificate 14 of the USB memory stick 12 connected to the USB interface 20 of the data processing system 18 is valid and actually authenticates the user as a valid user of the user group "Technicians". If it results from the check made by the certificate server 22 that the certificate 14 in connection with the serial number of the USB memory stick 12 and optionally a password which the service technician entered via a user interface of the data processing system 18 authenticates the user, the certificate server 22 communicates to the CSC-W32 API program module 28 that the authentication of the user was successful and the service and operating application program 26 can be further processed or, respectively, a safety-relevant function provided by this service and operating application program 26 can be activated. Given an invalid certificate 14 or, respectively, an unsuccessful authentication of the user, the certificate server 22 creates a corresponding response to the request of the CSC-W32 API program module 28, as a result whereof a further processing of the service and operating application program 26 or, respectively, the provision of a safety-relevant function, which have respectively caused the check, is not activated.

Figure 2:
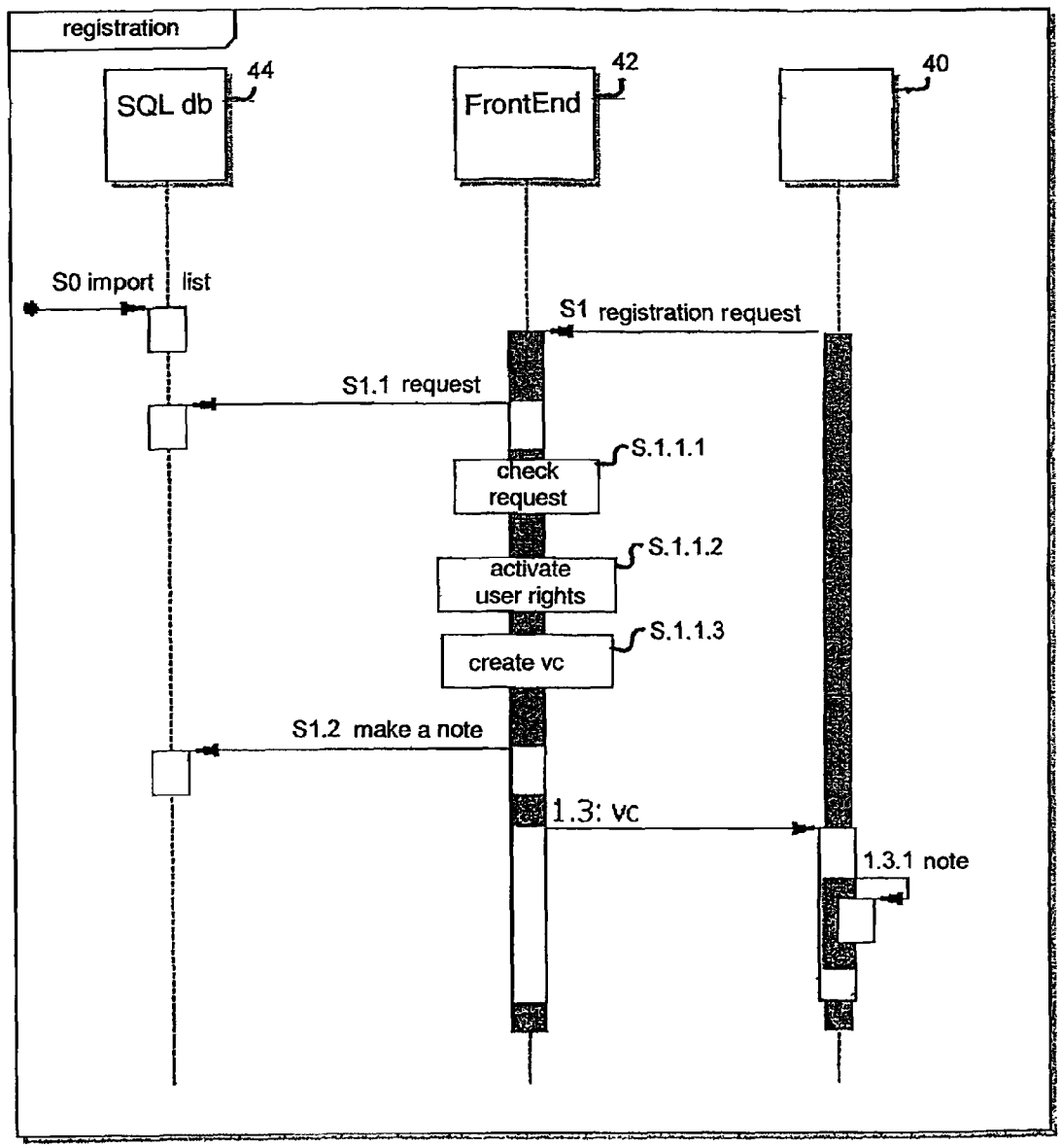
FIG. 2 shows a sequence for requesting, creating and storing a certificate for a user on a USB memory stick.

In FIG. 2, a sequence for requesting, creating and storing a certificate 14 for a user for personalization and activation of the USB memory stick 12 is exemplarily illustrated. Identical elements are identified by identical reference signs. As already described in connection with FIG. 1, the certificate is used to authenticate a user by the data processing system 18 as well as by further data processing systems. The USB memory stick 12 is personalized with the aid of a client-server-application for a specific user, for example for the already-mentioned service technician. In a non-illustrated pre-processing step, the registration at a registration authority has to be requested. The registration authority can, for example, be provided by the manufacturer of the money transaction device in which the data processing system 18 is contained.

The request for registration is manually processed by the certificate authority by administrative action and can be compared with the activation of a new user in a network. The applicant is registered as a user in a database. The applicant files the request, for example, via e-mail or phone. Alternatively, the request can be automatically created by a program module when a service technician is employed and/or a service technician or another user is newly registered for whom an authorization for activation of service and operating application programs and/or other safety-relevant programs and/or functions is to be performed. Thereafter, this request for certification is checked. If necessary, a telephone call or a communication via e-mail takes place in order to guarantee that the request really comes from the respective service technician. Subsequently, it is checked whether the desired user rights can be granted to the applicant, i.e. the service technician. Alternatively or additionally, suitable user rights are automatically determined based on the position of the service technician within the company and his/her function, which user rights are then assigned to the service technician and confirmed by a certificate. Preferably, the general user rights of the preset user group "Technicians" and, if necessary, further user rights are assigned to the service technician.

If, when checking the request, it is determined that this request of the applicant is accepted and corresponding user rights are to be assigned to him/her, then a master data record is created in a database and a certification process required for the certification is enabled by a database entry. Both the master data record and the certification process can be used for creating further certificates for the respective service technician.

FIG. 2 illustrates the communication sequence between a communication device 40 of the service technician, the call center of the certificate authority serving as a frontend 42 and a database 44 for the registration of users to be certified and certified users. In a step S0, identification information about preferably several technicians are forwarded to the database, which identification information comprises a list which is stored in a data file and contains this information assigned to the respective technician. With the aid of this identification information, those service technicians can be identified for whom a certificate 14 may be issued. This list can be stored for example in the form of a table made with the software program Microsoft Excel and be imported by the database 44.

In a step S1, the service technician makes a request with which he/she requests certification and applies for a desired user role or a user role preset with the aid of the identification data. The user role corresponds to the user rights assigned to a user group if the service technician is to become a member of the group. Generally, the user role corresponds to the user rights assigned to the respective user (service technician). The database 44 creates a separate data record for each list entry of the imported list, i.e. for each user to be registered. In a step S1.1, the frontend 42 makes a request to the database 44, the data record for the service technician is requested and read out from the database.

The authenticity of the service technician is, for example, determined by asking for an authentication code such as his/her date of birth, in a step S1.1.1. Further, the rights assigned to the service technician are activated in a step S1.1.2. Then, a verification code (vc) is created by the frontend 42. This verification code is entered in the data record of the service technician in the database 44. The verification code can, for example, be a cryptographic value which is formed on the basis of the data record of the service technician. Subsequently, in a step S1.2 the data record and/or the amended data of the data record are written into the database 44. In a step S1.3, the verification code is forwarded to the service technician. This can be done, for example, via phone or via data transfer, in particular via e-mail. Alternatively, the verification code can also be sent by mail. This verification code is required at a later point in time for the further authentication of the user, in particular to request one or more certificates at a later point in time. In a step S1.3.1, the service technician notes down the verification code or, respectively, stores it for further disposal.

Figure 3:
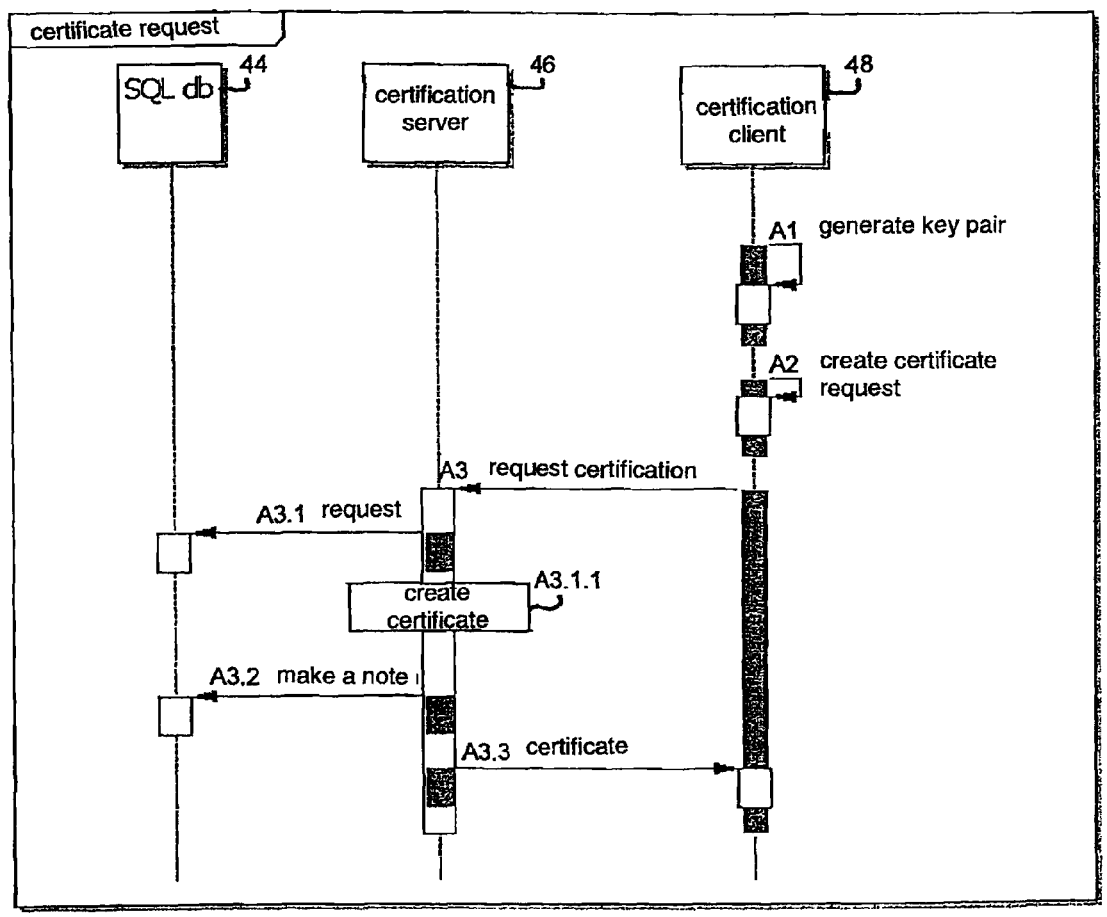
FIG. 3 shows a sequence for verifying a certificate stored on a USB memory stick.

In FIG. 3, a sequence for creating and transmitting a user certificate is illustrated. A certification client application program 48 is, for example, executed on a desktop PC or a notebook computer, with the aid of which a certificate is requested at a certification server 46. The client application program can, for example, be transferred via a network, such as an Intranet or the Internet, to the desktop computer or notebook computer, with the aid of which the certificate is requested. The client application program is executed on this computer. If necessary, the client application program is installed on the computer before execution and is appropriately registered with the required components of the operating system. Preferably, such a client application program has the following functions:

generation of an RSA key pair
personalization of a removable storage medium
a further function for post-personalization
change of password For example, the client application program can also be a browser-based and/or platform-independent Java application.

The certification server 46 is connected to the database 44 via a data connection. The certification server 46 and the database 44 can also be provided with the aid of one single data processing system by different software applications.

In a step A1, a key pair for the service technician is generated by the client application program. Subsequently, the client application program 48 creates a certification request in a step A2. For creating the request, a removable storage medium, preferably an USB memory stick 12 of the service technician is connected to the data processing system which executes the certification client application program 48. The certification client application program 48 reads out the serial number and preferably the manufacturer ID of the removable storage medium and integrates the same into the certification request. Further, the service technician determines a password which is likewise integrated into the certification request. This certification request is transferred in a step A3 from the certification client application program 48 to the certification server 46 which loads the data record for the technician for whom the certificate is to be created. Based on the information stored on the service technician in the database 44, in a step A3.1.1 a certificate 14 is created by the certification server in accordance with the authorization information stored in the database 44 for this service technician. In the step A3.1.1, the certification server 46 creates an attribute certificate, the serial number, the manufacturer ID code of the USB memory stick, the password and/or biometric data of the service technician serving as attributes for creating the attribute certificate. The created attribute certificate determines the user rights of the service technician on a data processing system, such as on the data processing system which executes the client certification program 48 or on the data processing system of the money transaction device. Further, by the user rights, the authorization for starting and executing certain application programs and/or safety-relevant functions can be determined, as already explained in detail in connection with FIG. 1.

Preferably, the certification request also comprises the verification code which has previously been transmitted to the technician, as described in connection with FIG. 2. Alternatively, this verification code can be transmitted in a separate communication between the certification client application program 48 and the certification server 46. In a step A3.2, a note is made in the data record of the service technician in the database 44 that a corresponding certificate has been created. Preferably, the entire data record of the service technician is newly written into the database 44.

In a step A3.3, the created certificate is transmitted from the certification server 46 to the certification client application program 48. The certificate is written by the certification client application program 48 into a storage area of the USB memory stick 12 which is connected to a USB interface of the data processing system that executes the certification client application program 48. The attribute certificate preferably has an expiration date which is included in the certificate created in the step A3.1.1.

After creating the certificate, information on the applicant, i.e. the service technician, permitted user rights or user roles, the certificate itself, the serial number of the USB memory stick 12 and/or the current status of the certificate are stored in the database 44. The status can, for example, be "requested", "issued" or "withdrawn". Both the certification client application 48 and the certification server application 46 can have graphical user interfaces. The server further has the following functions:
  administration of a key storage and at least one route certificate
  administration of users
  processing of certification requests
  logging of certification processes in the database 44

Preferably, together with the request for the certificate or in a separate communication at least the public key of the key pair generated in the step A1 is transferred to the certification server 42. The transferred key itself can be assigned to the user or can be stored in a key storage of the database 44 or in a storage area of the certification server 46.

The service and operating application program 26 of the data processing system 18 can provide functions which can only be executed when a user is authenticated to whom user rights required for this, i.e. a specific user role, is assigned.

The removable storage medium can preferably also be used in order to fetch the log and trace data created by the data processing system 18 automatically as a so-called packet. As a result thereof, it can be guaranteed that all necessary log and trace data have been copied onto the removable storage medium for evaluation purposes. The authorization for copying and the copy operation itself can automatically be checked and initiated with the aid of the certificate stored on the removable storage medium as well as the identification information of the removable storage medium.

In particular, write and read accesses to the removable storage medium are only allowed when a valid certificate is stored on the removable storage medium which certificate authenticates a user having such a write and read authorization. For safety reasons, another write and read possibility to and from the removable storage media cannot be allowed.

Further, program data of service and application programs can be stored on the removable storage medium, which data can preferably only be executed by the data processing system 18 when a valid certificate is stored on the removable storage medium, which together with the identification information of the removable storage medium confirms an authorization for these write and read accesses.

If data are to be stored on the removable storage medium, these are preferably compressed and/or stored in a protected data file. Preferably, the data are stored in an encrypted form with the aid of a public key of an RSA key pair.

In the filename of the stored data file, preferably a serial number of a money transaction device in which the data processing system 18 is located can be included. The data processing system 18 can in particular be a suitable personal computer and/or a suitable control unit.

The database 44 is preferably an SQL database in which the name, address, company, department, phone number, e-mail address, serial number of the removable storage medium, assigned certificates, validity of the certificates, contact person, date and status are stored for each of the users to be certified and/or certified users. Preferably, the history of individual data is likewise acquired so that changes can also be reconstructed at a later point in time. Given the following events, the database 44 and/or the certification server 46 generates a piece of information, in particular the database 44 and/or the certification server 46 automatically creates an e-mail:
  to the certificate authority on incoming requests;
  to the applicant after activation of the request inviting him/her to fetch the certificates;
  to the applicant prior to the expiration of individual certificates as a reference to request an extension and/or a new certificate, and
  to the applicant when new and/or extended certificates are available.

By linking the serial number of the removable storage medium, the manufacturer ID of the removable storage medium and/or a freely selectable password in a standard X.509 attribute certificate, relatively cost-efficient standard removable storage media, such as USB removable storage media, can be used for authenticating a user. With the aid of this user authentication data protection and data safety can be increased.

The invention claimed is:
1. A system for authenticating a user at a money transaction device, comprising:
  a non-transitory removable storage medium that comprises a first storage area in which identification data for identifying the removable storage medium is stored, wherein data of a digital certificate is stored in the first storage area or in a further storage area of the removable storage medium; and
  a data processing system in the money transaction device that is operable to be connected via a data transfer connection to the removable storage medium, wherein:

the identification data and the data of the digital certificate are transferred from the removable storage medium to the data processing system, the data processing system processes the identification data and the data of the digital certificate and selectively authenticates the user, only in response to successful authentication of the user, the data processing system transfers first data from the data processing system to the removable storage medium, and write and read access to the removable storage medium only being allowed when a valid certificate is stored on the removable storage medium, said certificate authenticating the user as having authorization to write to and read from the removable storage medium;

wherein:
the certificate specifies a public key of an asymmetric key pair of the user;

the data processing system encrypts the first data with the public key to create encrypted first data that can be decrypted with a corresponding private key of the asymmetric key pair; and only in response to the successful authentication of the user, the data processing system transfers the encrypted first data to the removable storage medium.

2. The system according to claim 1, wherein the data processing system:
identifies the user,
selectively authenticates the identified user, and
only in response to the successful authentication of the identified user, assigns rights to the identified user based on (i) an identity of the identified user or (ii) a user group to which the identified user belongs.

3. The system according to claim 2, wherein the user is identified by entering a user name, by a serial number of the removable storage medium, or by the digital certificate.

4. The system according to claim 1, wherein:
the digital certificate is an attribute certificate,
the identification data and/or a password are used as attributes that are linked to the certificate by a certificate authority, and
the attribute certificate refers to at least one of (i) the attributes and (ii) a further certificate.

5. The system according to claim 1, wherein the data processing system checks validity and/or authenticity of the digital certificate.

6. The system according to claim 1, wherein the identification data includes manufacturer identification data and a serial number information code, and wherein the manufacturer identification data and the serial number information code are attributes of the certificate.

7. The system according to claim 1, wherein the money transaction device is a cash deposit machine, a cash dispensing machine, a cash recycling machine, an automatic cash system, and/or a cash register system.

8. The system according to claim 1, wherein the certificate has a fixed validity such that the certificate becomes invalid with expiration of the fixed validity and is no longer accepted by the data processing system.

9. The system according to claim 1, wherein:
the non-transitory removable storage medium is an external hard disk and/or an external flash memory,
the removable storage medium connects to the data processing system via a USB interface.

10. The system according to claim 1, wherein, only in response to the successful authentication of the user, the data processing system allows the first data to be transferred from the removable storage medium to a further data processing system.

11. The system according to claim 1, wherein the certificate is created during an initialization process.

12. The system according to claim 1, wherein the certificate is created according to the X.509 standard.

13. The system according to claim 1, wherein:
the identification data is stored by a manufacturer during production of the removable storage medium as read-only data in the first storage area of the removable storage medium, which cannot be modified, and
the further storage area of the removable storage medium is rewritable.

14. The system according to claim 1, wherein the digital certificate authorizes the user for execution of at least one application program by the data processing system.

15. The system according to claim 1, wherein the data processing system checks whether the user is authorized for activating a function provided by a program of the data processing system and, only after a successful check, the function is activated and/or executed by the data processing system.

16. The system according to claim 1, wherein a registration authority processes a request for a certificate and checks the request, a process for certification being enabled given a positive check.

17. A method for authenticating a service technician at a money transaction device, the method comprising:
connecting a non-transitory removable storage medium of the service technician to a data processing system in the money transaction device, wherein
a first storage area of the removable storage medium stores identification data for identifying the removable storage medium,
the removable storage medium is a pluggable flash memory without a controller, and
data of a digital certificate is stored in the first storage area or in a further storage area of the removable storage medium;
reading the identification data and the data of the digital certificate from the storage area of the removable storage medium;
transferring the identification data and the data of the digital certificate via a data transfer connection to the data processing system;
in the data processing system, processing the identification data and the data of the digital certificate to authenticate the service technician;
only in response to successful authentication of the service technician:
transferring first data from the data processing system to the removable storage medium, and
transferring the first data from the removable storage medium to a further data processing system not located in the money transaction device; and
write and read accesses to the removable storage medium only being allowed when a valid certificate is stored on the removable storage medium, said certificate authenticating the user as having authorization to write to and read from the removable storage medium;
wherein:
the certificate specifies a public key of an asymmetric key pair of the user;

the data processing system encrypts the first data with the public key to create encrypted first data that can be decrypted with a corresponding private key of the asymmetric key pair; and only in response to the successful authentication of the user, the data processing system transfers the encrypted first data to the removable storage medium.

18. The method according to claim 17 wherein the further data processing system is a laptop computer of the service technician; and wherein the removable storage medium contains service and application programs that can only be executed by the data processing machine upon successful authentication of the service technician.

19. The method according to claim 17, wherein the money transaction device is a cash deposit machine, a cash dispensing machine, a cash recycling machine, an automatic cash system and/or a cash register system.

20. A system for authenticating a user at a money transaction device, the system comprising:

a non-transitory removable storage medium including identification data identifying the removable storage medium;

a digital certificate stored on the removable storage medium, the digital certificate specifies a public key of an asymmetric key pair of the user, and identifies the user as having authorization to write to, and read from, the removable storage medium using the money transaction device;

a data processing system of the money transaction device;

a data transfer connection of the money transaction device configured to connect the removable storage medium to the data processing system of the money transaction device;

wherein upon connection of the removable storage medium to the data transfer connection:

the identification data and the digital certificate are transferred to the data processing system;

the data processing system selectively authenticates the user based on the identification data and the digital certificate, and grants read and write access to the removable storage medium;

subsequent to authentication of the user of the removable storage device, the data processing system transfers first data from the data processing system to the removable storage medium;

the data processing system encrypts the first data with the public key specified by the certificate to create encrypted first data that can be decrypted with a corresponding private key of the asymmetric key pair; and the data processing system transfers the encrypted first data to the removable storage medium.

\* \* \* \* \*